July 14, 1953  G. GORHAM  2,645,550
MULTIPLE LEAD ELECTROCARDIOGRAPH RECORDER
Filed July 22, 1947  5 Sheets-Sheet 1

INVENTOR.
George Gorham
BY
Harry Cohn
ATTORNEY

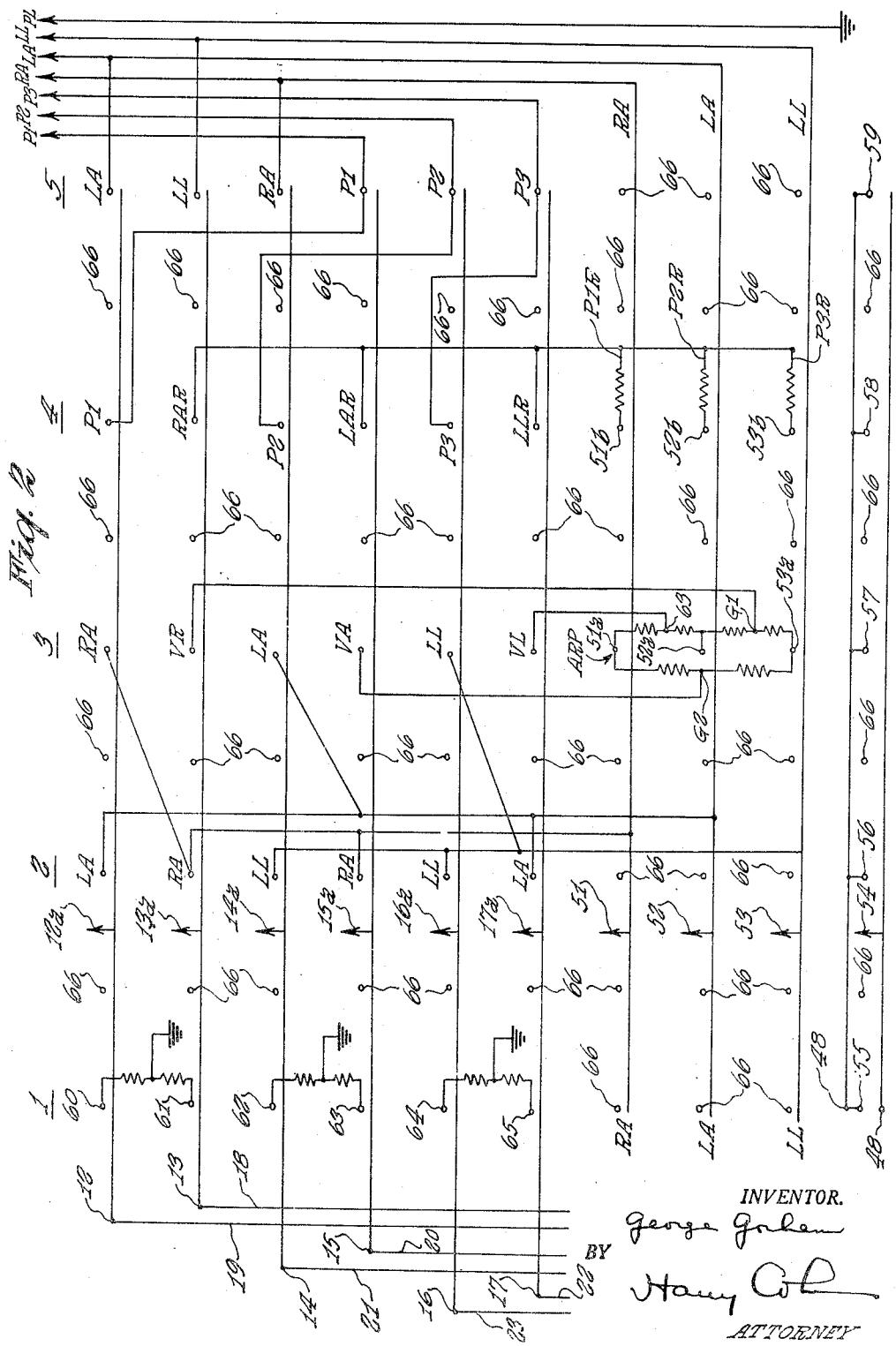

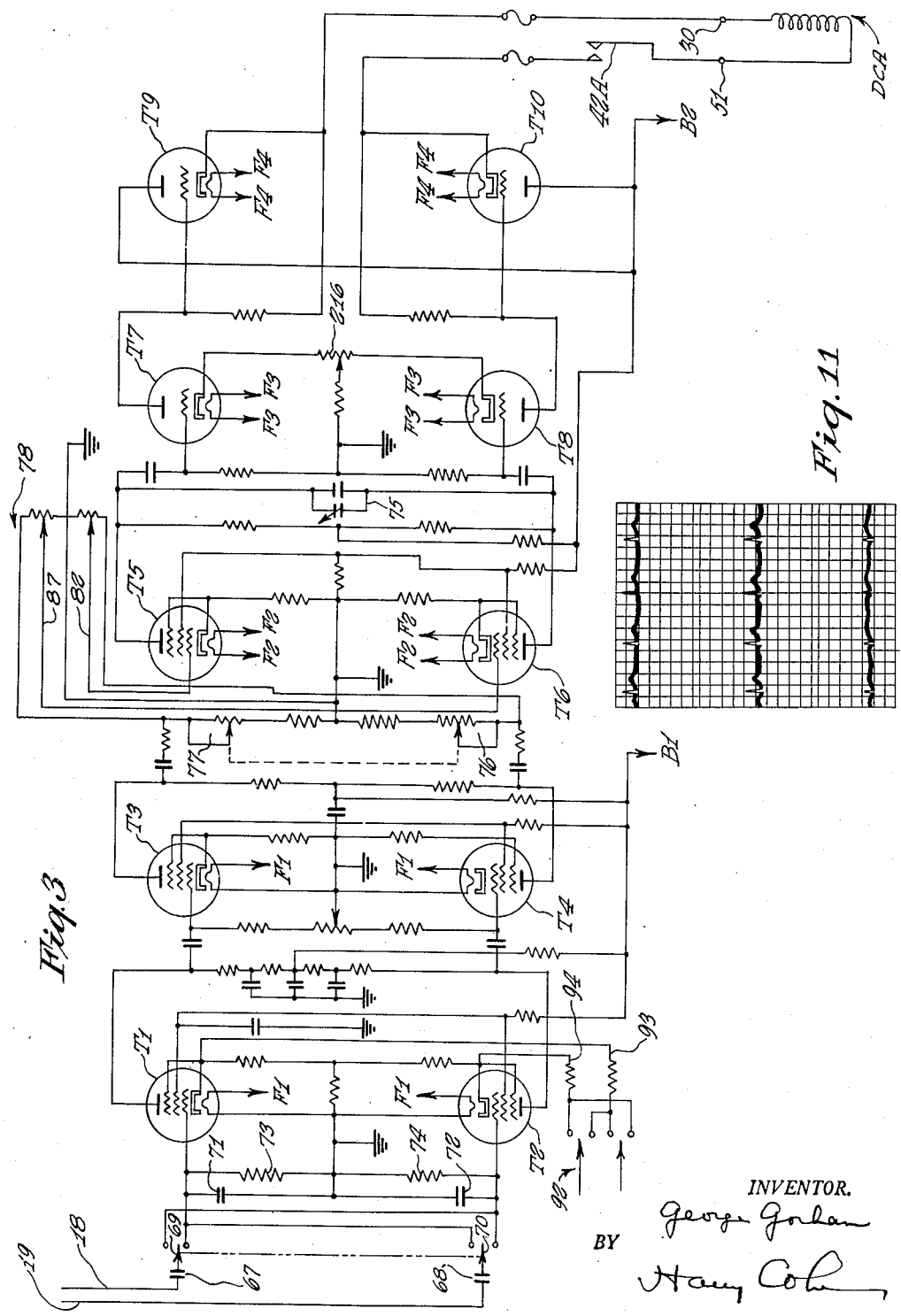

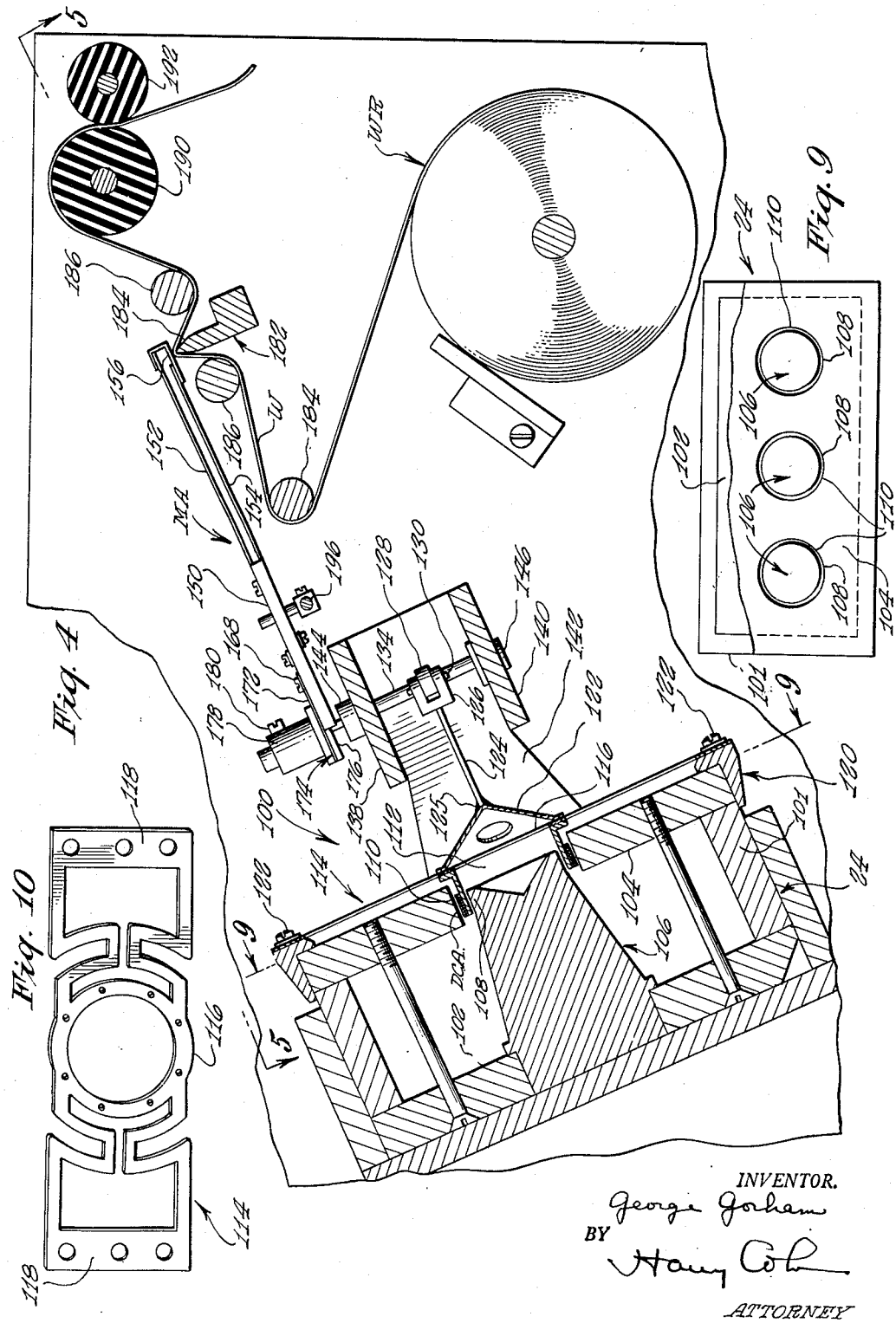

July 14, 1953 G. GORHAM 2,645,550
MULTIPLE LEAD ELECTROCARDIOGRAPH RECORDER
Filed July 22, 1947 5 Sheets-Sheet 5
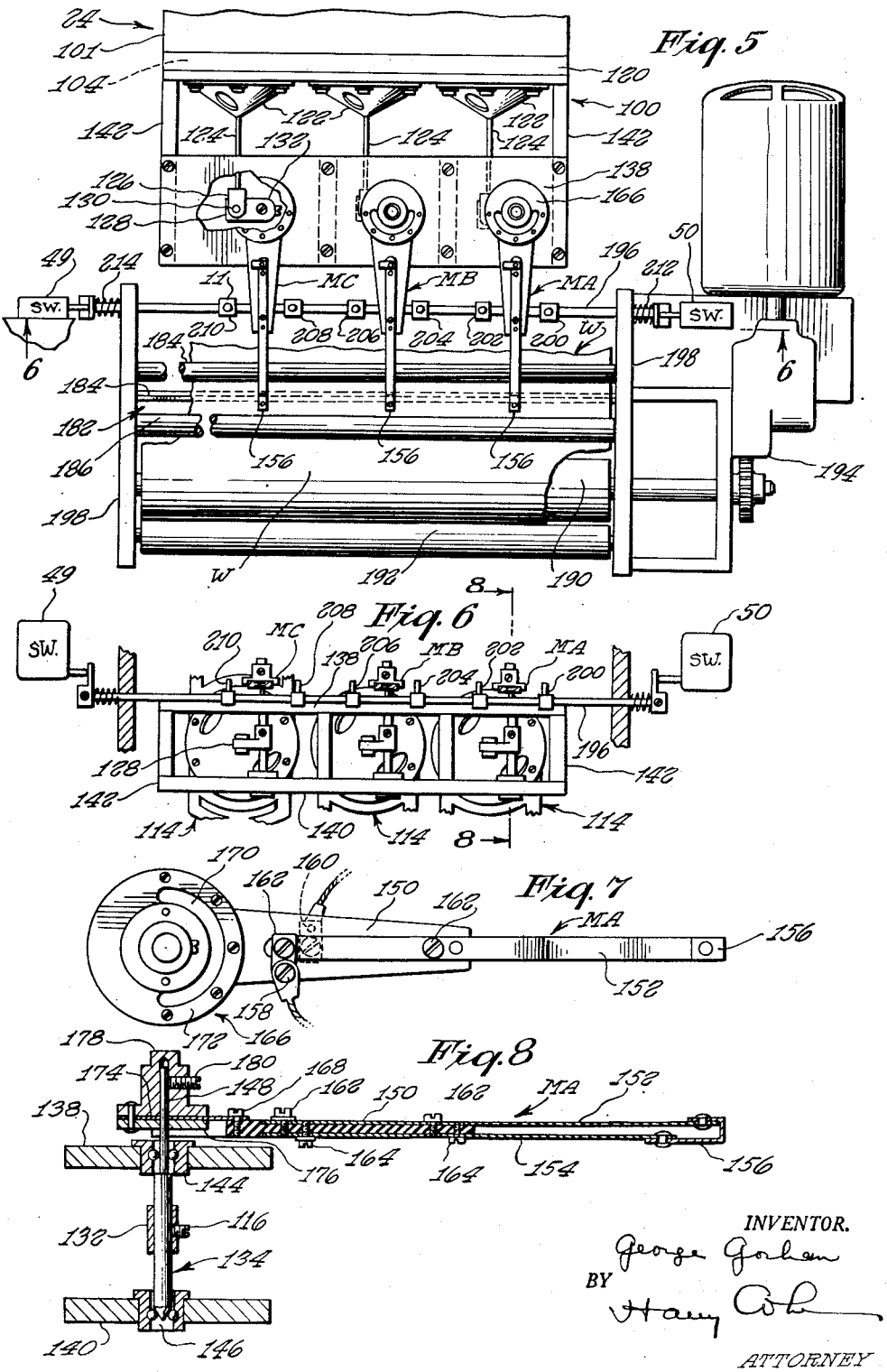
INVENTOR.
George Gorham
BY
Harry Cohn
ATTORNEY Patented July 14, 1953

2,645,550

UNITED STATES PATENT OFFICE 2,645,550

MULTIPLE-LEAD ELECTROCARDIOGRAPH RECORDER

George Gorham, New York, N. Y., assignor, by mesne assignments, to Technicon Cardiograph Corporation, New York, N. Y.

Application July 22, 1947, Serial No. 762,613

17 Claims. (Cl. 346—49)

This invention relates to electro-cardiographs and more particularly to electro-cardiograph recorders.

The primary object of the invention is to provide a direct-writing recorder for a multiple-lead electro-cardiograph and particularly a recorder which is especially well adapted to record a plurality of electro-cardiograms on a sheet of recording material in the same time relation.

Another object is the provision of electromagnetic means which is well adapted to operate the pen-actuating mechanisms of the recorder in such manner as to enable the cardiograms to be recorded simultaneously and in matched relation in respect to potential values. In other words, the plurality of pens or marking elements all have the same amplitudes of deflection or excursion in proportion to the same voltage values, respectively.

A further object of the invention, ancillary to the foregoing objects, is to provide means which assures operation of the marking elements on the recording sheet in aligned relation laterally thereof at any instant during the travel of the sheet.

A further object is to provide means for interrupting the operation of all of the marking elements in the event of over-excursion of any one or more of said elements.

A yet further object is generally to provide an electro-cardiograph recorder which is reliable in operation in conjunction with multiple-channel body-potential amplifiers and auxiliary apparatus of a multiple-lead electro-cardiograph.

The above and other objects, features and advantages of the invention will be fully understood from the following description considered in connection with the accompanying illustrative drawings.

In the drawings:

Fig. 2 is a diagrammatic illustration of the control or selector switch and its circuit;

Fig. 3 is a circuit diagram of one of the channels and is illustrative of each of the other channels;

Fig. 4 is a sectional view of the recorder unit;

Fig. 5 is a top view, on a smaller scale, of the recorder unit, as observed from the line 5—5 of Fig. 4;

Fig. 6 is a view on the line 6—6 of Fig. 5;

Fig. 7 is a top view of one of the pens or marking elements;

Fig. 8 is a sectional view on the line 8—8 of Fig. 6;

Fig. 9 is a view of the magnet structure of the electromotive device for operating the pens, on the line 9—9 of Fig. 4, the driving coils not being shown and a part of the magnet structure being cut away for the purpose of illustration;

Fig. 10 is a side view of one of the spring diaphragms of the pen-operating mechanism.

Fig. 11 is illustrative of a multiple-lead cardiogram made on the apparatus of the present invention.

Figure 1:
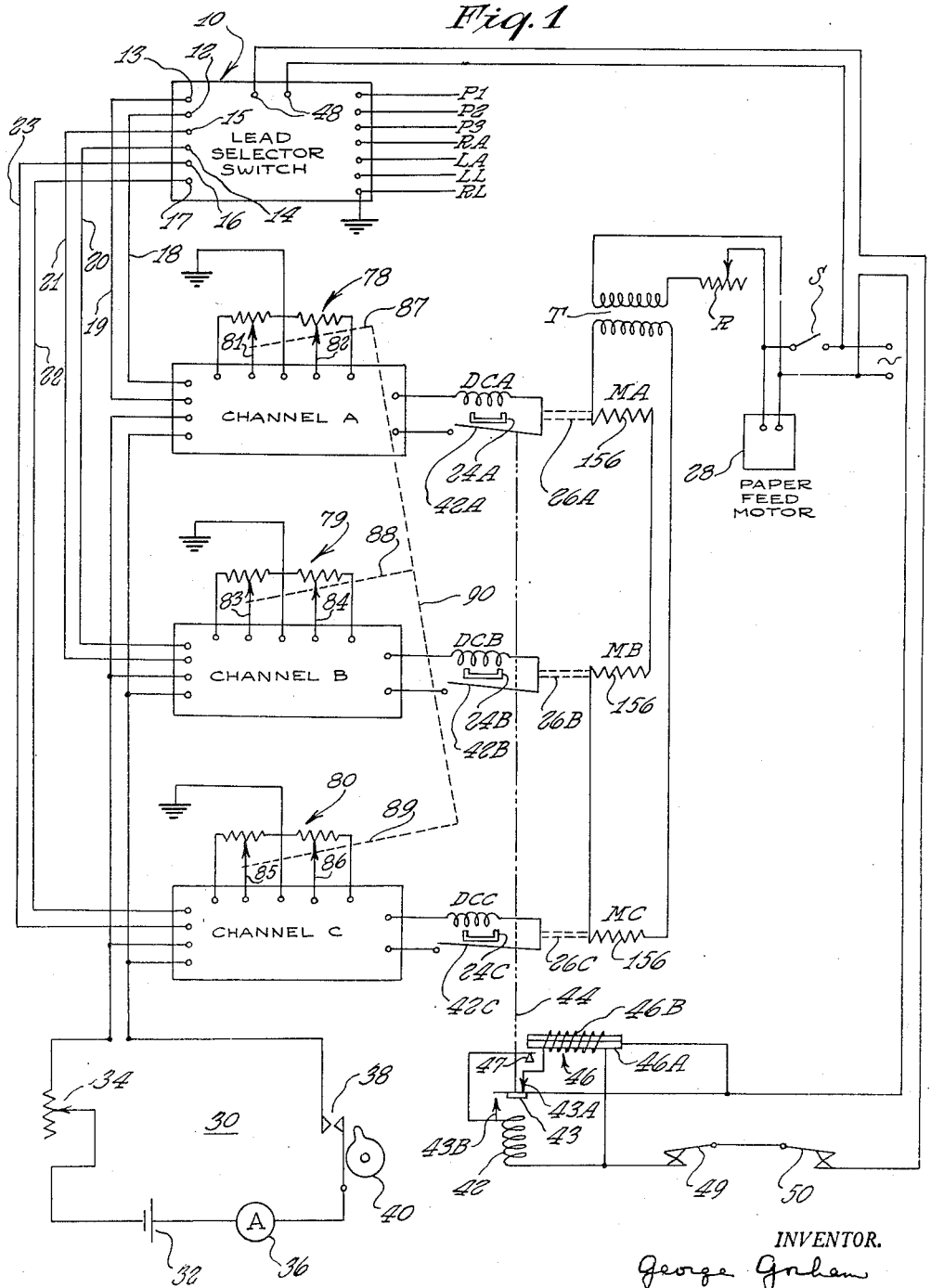
Fig. 1 is a schematic illustration of an electrocardiograph provided with a recorder embodying the present invention.

Heretofore, it was the practice to take one cardiogram at a time by connecting an electrocardiograph to a single pair of electrodes applied to two different parts of the subject's body, for example to the left arm and right arm, or to the right arm and left leg, or to the left arm and left leg, or to a precordial point and one of the arms or left leg of the subject. Ordinarily a group of cardiograms are taken, the group, however, being made up of out-of-phase cardiograms taken by connecting the cardiograph necessarily at different times to said different pairs, respectively, of different parts of the subject's body. Cardiograms thus taken at different times are not necessarily indicative of the same condition of the heart, even if the interval of time which must necessarily elapse between the taking of the cardiograms is very short, since under such circumstances the cardiologist cannot be sure that the condition of the patient's heart was the same during the successive periods of time required to obtain the several cardiograms. Moreover, in thus taking the cardiograms at different times, even with very short intervening periods of time, the several cardiograms are not related to a common time co-ordinate. For this latter reason, even if it is assumed (as it necessarily must be) that there has been no change in the patient's condition, it is very difficult, if not impossible even for a highly skilled and competent cardiologist to interpret and correlate accurately and properly the information available from a study of the out-of-phase cardiograms. These serious objections and disadvantages are overcome by the present invention. The preferred mode of accomplishing this important result according to the present invention will now be described.

A recorder embodying the present invention is illustrated in Figs. 4 to 10, but before this recorder is described in detail the circuit and apparatus illustrated in Figs. 1 to 3 will be described in order to facilitate the explanation and understanding of the present invention. It is to be understood, however, that while the circuit and apparatus illustrated in Figs. 1 to 3 are presently preferred for use with the recorder embodying my invention, the latter is not limited to use with that particular circuit or apparatus but may be used with any suitable circuit and auxiliaries capable of operating the recorder properly to record multi-lead cardiograms. The circuit and apparatus of Figs. 1 to 3 as well as the recorder illustrated in Figs. 4 to 10 are also shown and described in the application of Nathan Marchand to be filed concurrently herewith and certain features which are disclosed but not claimed herein are claimed in said application of Nathan Marchand, Ser. No. 762,633.

As shown more or less schematically in Fig. 1, the electro-cardiograph comprises a lead selector switch 10 having a plurality of input terminals designated P1, P2, P3, RA, LA, LL, RL, adapted to be connected by suitable conductors and companion electrodes (not shown) to different parts, respectively, of the subject whose heart condition is to be investigated. The terminal RL is to be connected to the right leg of the subject and is grounded as shown. The terminals RA, LA, and LL are the extremity terminals for connection, respectively, to the subject's right arm, left arm and left leg, in accordance with known principles of cardiology. The terminals P1, P2 and P3 are the precordial terminals. As will hereinafter more specifically appear, three leads are connected by movable contact members to three selected input terminals of the switch. The movable contact members are connected in pairs to the three pairs of output terminals 12—13, 14—15, and 16—17, of the switch. For example, in one setting of the switch 10, the RA and LA leads are connected to terminals 12 and 13, respectively, the LL and RA leads are connected to the terminals 14 and 15, respectively, and the leads LL and LA are connected to the terminals 16 and 17, respectively. In other settings of the switch, the three leads are connected to different input terminals of the switch, as will be later explained.

The three leads, thus connected to the selected input terminals are connected by means of the conductors 18—19, 20—21, and 22—23, respectively, to three channels A, B, and C, respectively. Each of said channels includes electronic amplifying means for amplifying the body voltages transmitted to said channels by said three leads from across three pairs of different parts of the subject's body. The electrical circuits of these channels are all alike, one of these circuits, subsequently described herein, being shown in Fig. 3 as illustrative of the electrical circuit of each channel, there being three such circuits, one for each channel.

The output terminals of said channels are connected to the driving coils DCA, DCB, and DCC, respectively, of the magneto-motive devices which are provided in the apparatus for operating the recorder. These magneto-motive devices include a strong permanent magnet shown schematically in Fig. 1 as three permanent magnets 24A, 24B, and 24C. The driving coils are mechanically connected individually to the pens or marking elements MA, MB, and MC which operate on the recording material to record the voltage variations supplied to said channels and amplified by the amplifying means provided therein as hereinbefore indicated. The recording material is preferably, but not necessarily, chemically treated paper of a known type and when such paper is used the pens or marking elements are electrically heated, as indicated by the resistances designated by the foregoing reference characters MA, MB, and MC. As will be readily understood the paper is affected by the heat of said elements whereby visual records are produced directly on a length of said paper during the movement of the latter in the direction of its length. The connections of the driving coils to the companion marking elements are indicated schematically in Fig. 1 by the dotted lines 26A, 26B and 26C. The corresponding mechanisms will be described subsequently in detail. As indicated, a synchronous motor 28 is provided for moving the recording material or paper at uniform speed in the direction of its length. The motor is preferably energized by 60 cycle alternating current at 110 volts, and a step-down transformer T is provided for supplying heating current to the resistances of the marking elements or pens MA, MB, and MC. An adjustable resistance R is provided in the primary circuit of the transformer for regulating the heat of said marking elements.

Provision is made for supplying standardization voltage impulses to the three channels. For this purpose, the circuit 30 is connected to each of said channels, suitable reversing switches being provided as shown in Fig. 2 and later described. Circuit 30 includes a battery 32, as the source of voltage, a variable resistance 34, an ammeter 36, and a normally open pulse switch 38 which is periodically closed by a rotary pulse wheel 40 actuated at the proper speed in any suitable way, as by a clock motor (not shown). Ordinarily the standardization voltage is of the order of one millivolt. It will be noted that the standardization pulses are superimposed upon the several cardiograms, respectively, during the operation of the apparatus while the leads are connected to the patient or subject.

Provision is made for stabilizing the action of the amplifiers in the channels before operating the marking elements MA, MB and MC of the recorder. For this purpose there is provided a time delay relay which includes an electromagnet the winding of which is indicated at 42. Movable switch contacts 42A, 42B and 42C are closed by the movable core 44 of the electromagnet when the latter is energized and are opened when it is de-energized. A thermostatically controlled switch 46 having a suitable time lag in closing is provided in the circuit of winding 42 and it will be noted that the lead selector switch 10 is provided with terminals 48 which are connected in said circuit so that, as hereinafter described, the energization of relay winding 42 is under the master control of switch 10. The operation of switch 10 is such that winding 42 is de-energized and contacts 42A, 42B and 42C therefore opens, whenever switch 10 is actuated to change the combination of leads which are connected to the channels, and do not close until the thermostatically controlled time-delay switch 46 closes. Thus the marking elements or pens MA, MB and MC are prevented from operating until the action of the amplifiers in the several channels becomes stable.

The circuit of winding 42 also includes the normally closed switches 49 and 50 which are in series circuit relation with each other and with said winding. These switches are opened in the event of over excursion of any one of the marking elements in either direction laterally of the web of recording material. The preferred mechanism for accomplishing this result is hereinafter explained with reference to the illustration thereof in Figs. 4 and 5 of the drawing. It will be noted that if either of switches 49 and 50 opens, winding 42 is de-energized and contacts 42A, 42B, and 42C open so that all of the driving coils for the marking elements are simultaneously de-energized thus stopping the motions of the marking elements. When either switch 49 or 50 closes after it is opened by over excursion of any one of the marking elements, the winding remains de-energized and contacts 42A, 42B and 42C consequently remains open until the time delay switch 46 operates to close the circuit of said winding, thus affording the amplifiers in channel A, B and C time for resuming their stable action.

The selector switch 10, which may be of any suitable mechanical construction, is illustrated diagrammatically in Fig. 2. The movable switch contacts are indicated at 12A—13A, connected to terminals 12—13 for channel A; at 14A—15A, connected to terminals 14—15 for channel B; at 16A—17A, connected to terminals 16—17 for channel C. Additional movable contacts are indicated at 51, 52 and 53 and are connected to the RA, LA, and LL terminals. The movable contact indicated at 54 is connected to one of the terminals 48, the other terminal 48 being connected to the spaced stationary contacts 55, 56, 57, 58 and 59. For convenience it may be assumed that all of the foregoing movable contacts move rectilinearly, and it will be understood that they are mechanically connected for movement in unison to and from each of the several stations 1, 2, 3, 4, and 5. Station 1 is the pre-lead test station having stationary contacts 60—61, 62—63, and 64—65 as the end terminals of the resistances shown. Each of said resistances has a mid-tap which is connected to ground as shown. These resistances are substitutes for resistances which are present when the leads are connected to the subject and are provided so that the apparatus may be tested before the leads are connected to the subject.

At station 2, the movable contacts for the three channels are connected to the LA—RA, LL—RA, and LL—LA terminals.

At station 3, the movable contacts for the three channels are connected to the three leads for the augmented extremity potentials known and designated in cardiology as aVR, aVL, and aVF. One stationary contact for each of the leads for augmented extremity potential consists of one of the RA, LA and LL terminals, as indicated, and the companion stationary contacts for the three channels are indicated at VR, VA and VL, respectively. The stationary contacts RA, LA and LL at station 3 are connected to the corresponding terminals by the movable contacts 51, 52 and 53 and the companion stationary contacts 51A, 52A and 53A provided in the closed loop ARP which includes the resistances shown for obtaining the augmented extremity potential. The stationary contacts VR, VA and VL are connected directly to fixed points, respectively, on said loop as indicated at G1, G2, and G3, respectively. Thus, the three augmented extremity potentials are transmitted simultaneously to the three channels, respectively, when the movable switch contacts are at station 3 so that said potentials can be recorded simultaneously by the corresponding marking elements on the recording web in the same time relation. It will be noted that the resistances connected as shown in the closed loop provide a common point of connection from RA, LA and LL and at the same time the resistance in each connection from RA, LA and LL to said common point is eliminated in measuring the several potentials across RA and said common point, across LA and said common point, and across LL and said common point. The measuring of augmented extremity potentials across a common point and RA, LA, and LL, respectively, and eliminating the effect of the resistance in taking each measurement is known practice in cardiology but heretofore, so far as I am aware, it was not possible to measure more than one potential at a time. The provision of the loop ARP and the switching connections heretofore described enable the simultaneous measurement and recording of the three augmented potentials.

At station 4, the precordial leads P1, P2 and P3 are connected to the channels A, B and C, respectively, by the movable contact members 12A—13A, 14A—15A, and 16A—17A together with the movable contact members 51, 52 and 53 which connect the RA, LA and LL terminals through the resistances P1R, P2R and P3R, respectively to the stationary contacts RAR, LAR, and LLR which are companionate with the stationary contacts P1, P2 and P3, respectively at station 4. The stationary contacts which are engaged by movable contacts 51, 52 and 53 at this station are indicated at 51b, 52b and 53b as terminals of the resistances P1R, P2R, and P3R, respectively. The function of these resistances is well known in cardiology but it will be noted that their arrangement and the switch-contact arrangement enables the simultaneous connection of the three precordial leads to the three channels for simultaneous recording of the potentials in accordance with the present invention. At station 5, the movable contacts 12a—13a, 14a—15a, and 16a—17a connect the LA—LL, the RA—P1, and the P2—P3 terminals to the channels A, B, and C, respectively, for simultaneous recording of the corresponding potentials by the marking elements MA, MB and MC in the same time relation on the recording sheet or web.

It will be noted that at each of the stations there is a stationary contact member which is engaged by the movable contact member 54 so as to energize the circuit of the time delay relay 46 and relay winding 42 for closing the circuits of the driving coils DCA, DCB and DCC as hereinbefore explained with reference to Fig. 1.

Further, it will be observed that in moving from one station to another, all of the movable contact members of switch 10 have intermediate disengaged or off positions, respectively, so that the switch may be opened at all of its contacts without requiring movement of the movable switch contacts to one particular off or switch-open station or position. The off positions of the movable contact members are all indicated by the same reference numeral 66.

As hereinbefore explained each of the channels A, B and C (Fig. 1) comprises electronic amplifier means to which the several conductors 18—19, 20—21, and 22—23 from the selector switch are connected. As all of the channels and their amplifiers are alike a description of one, channel A being arbitrarily selected for this purpose, will suffice. Referring now to the channel circuit shown in Fig. 3, it will be noted that the conductors 18—19 are connected to the input of the voltage amplifier through the blocking condensers 67 and 68 by reversing switches 69 and 70. Condensers 67 and 68 block direct current which might otherwise flow from the subject to the amplifier. Condensers 71 and 72 are provided to by-pass radio frequencies which might be present in the region of the apparatus.

Provision is made to enable the same lead to be connected to a plurality of channels without affecting amplitude or causing interaction. This is accomplished by providing means for preventing loading of one channel to the detriment of another channel to which the same lead is connected. For this purpose there is provided a high impedance comprising the resistances 73 and 74 which, for example but without limitation, are each of the order of 4.7 megohms. Other known devices may be used instead of said high impedance; for example, a cathode follower isolation amplifier may be provided in each of the lines leading to the terminals P1, P2, P3, RA, LA, and LL of switch 10 (Fig. 1).

As shown in Fig. 3, the amplifying means comprises a resistance-capacity coupled voltage amplifier, which includes the tubes T1—T2, the tubes T3—T4, and the tubes T5—T6 and a power amplifier which includes the tubes T7—T8 and the tubes T9—T10. In this respect, the amplifier circuit is of the type described and claimed in the application of Joseph Lukacs, Ser. No. 725,026, filed January 29, 1947, and assigned to the assignee of the present application. It will be understood that the voltage amplifier provides sufficient amplification to drive the power amplifier for full excursion of the companion marking element or pen MA, MB, or MC as the case may be. It is to be noted that the amplifying means may be of any other suitable type and that the present invention is not to be limited to the use of an amplifier of the type disclosed in said Lukacs application.

In accordance with the present invention, the voltage amplifier is compensated for the mechanical properties of the pen and its mechanism which includes the companion driving coil and the means, hereinafter described, for operatively connecting the driving coil to its pen for actuating the latter. This compensation is accomplished by the damping control means which is preferably a capacitor 75 across the input to the power amplifier. As indicated capacitor 75 is preferably variable. Any other suitable damping control means may be used instead of the capacitor 75 without departing from the underlying idea of the invention in respect to this feature. It will be understood that the voltage and power amplifier thus provided with the damping control consequently has a gain which decreases at the frequencies at which the pen system has a high sensitivity and increases at the frequencies at which the pen system has a low sensitivity, whereby the pen or marking element of said system has a uniform excursion for the same voltage-magnitude input to the amplifier at any frequency within a range of frequencies, namely a substantially straight-line voltage-response at any frequency within a range for which the apparatus is adapted to be used. Also, as a result, over-excursion of the pen or marking element is prevented.

As shown in Fig. 3, each channel has its individual gain control means, which includes the adjustable resistances 76 and 77, so that the gain is set individually for each channel. The sensitivity controls for channels A, B and C are indicated in Fig. 1 at 78, 79, and 80, respectively, and said sensitivity control 78 is also shown in Fig. 3. It will be understood that sensitivity controls 79 and 80 for channels B and C are connected in their respective amplifier circuits in the same way as control 78. As indicated in Fig. 1, the movable resistance-adjusting members 81—82, 83—84, and 85—86 of sensitivity controls 78, 79 and 80, respectively, are all connected or ganged for movement in unison by a unicontrol device diagrammatically indicated by the dot and dash lines designated 87, 88, 89 and 90.

As shown in Fig. 1, the time delay switch 46 comprises a bimetallic strip 46A which is heated by the heater 46B when switches 49, 50 are closed and when the movable contact 54 of switch 10 is connected to any one of the stationary contacts 55, 56, 57, 58 and 59 of switch 10, power supply switch S being closed. When said thermostatic strip 46A is heated sufficiently it closes the circuit through winding 42 at contact 47, whereupon armature 43 is attracted and opens the heater circuit at contact 43 and closes the circuit, at contact 43b, through winding 42, simultaneously short-circuiting the heater 46b. The switch operating rod 44 is connected to armature 43 so that when the latter is attracted, switches 42A, 42B and 42C are closed and remain closed until the winding 42 is de-energized by the opening of the switches 49 or 50 or by movement of contact member 54 of the selector switch to an off position.

The standardization voltage circuit 30 (Fig. 1) is connected as shown in Fig. 3 through the reversing switch 92 to the leads 93 and 94 of the cathodes of tubes T1 and T2 of the voltage amplifier. The pulse wheel 40 of said circuit may be omitted and switch 38 may be closed manually for any desired period of time.

Referring now to the recorder unit illustrated more or less in detail in Figs. 4 to 10, said recorder comprises a magneto-motive device 100 which includes the permanent magnet 24 and the driving coils DCA, DCB and DCC for the pens or marking elements MA, MB and MC, respectively. This permanent magnet 24 shown in Fig. 1 as in three separate elements 24A, 24B and 24C, comprises the one-piece rectangular member 101 which is a strong permanent magnet, the soft iron plates 102 and 104, and the cores 106 which are fixed in plate 102 and have their free end portions positioned in the companion circular openings 110, respectively, of plate 104, in which the driving coils are mounted for axial movement as shown in Fig. 4. It will be noted that the single magnetic structure provides a common magnetic field for the several driving coils and thereby assures uniform magnetic flux for said coils, thus obviating the necessity for matching magnets if separate magnets, one for each coil, were provided. The winding of each driving coil is mounted on a light-weight sleeve 112 of insulation material, the latter and the winding carried thereby being axially movable as a unit, rectilinearly, in the annular air gap defined by the peripheral end portion 108 of core 106 and the peripheral edge of plate 104 which defines the companion opening 110. Each sleeve 112 is fastened to a companion diaphragm 114 of resilient sheet material. Said diaphragm is formed in one piece and comprises the central part 116, to which sleeve 112 is fastened, and the opposite end portions 118 which are secured and clamped to mounting member 120 in any suitable way as by machine screws 122. Said mounting member 120 is fixed to the magnet structure 24 in any suitable way, and it will be understood that the latter is carried by a stationary frame forming a part of the electro-cardiograph. It will be readily understood that diaphragm 114 resiliently opposes movement of the companion driving coils in either direction axially of said coil in the companion air gap of the magnet structure.

The marking elements or pens MA, MB, and MC are operatively connected to their driving coils, respectively, by the mechanisms which will now be described. As all of these mechanisms are alike, a description of one for which purpose the mechanism of element MA is arbitrarily selected, will suffice for all. The mechanism comprises a cone 122 of light sheet metal, such as copper, having its base fastened to the central part 116 of the companion diaphragm 114. A stem or rod 124 is fastened at one end 125 to said cone at its apex and is pivotally connected at its opposite forked end 126 to a crank arm 128 by means of a pivot pin 130. Crank arm 128 is part of a sleeve 132 which is secured to a shaft or spindle 134 in any suitable way, as by a set screw 136, so that said sleeve is adjustable longitudinally of said spindle.

The spindles 134 are mounted for turning movement in a stationary support comprising the upper and lower plates 138 and 140, respectively, fixed to and carried by the bracket arms 142, the latter being fixed and projecting from the magnetic structure 24. Said plates 138 and 140 are provided with anti-friction bearings 144 and 146, respectively, for each spindle. The reduced upper end part 148 (Fig. 8) of spindle 134 projects upwardly beyond upper plate 138 for connection to the companion marking element. It will be noted that the spindles 134 for the three marking elements or pens MA, MB and MC are disposed in laterally spaced relation and that the marking elements, being secured to said spindles, are similarly disposed in laterally spaced relation.

All of the marking elements are alike and each comprises an insulation strip or support 150 for companion metal conductor strips 152 and 154 which are secured to strip 150 at the opposite sides of the latter which spaces and insulates said strips from each other. The outer ends of strips 152 and 154 are electrically connected to each other by the resistance strip 156 which constitutes the heating member which acts on the recording material. Terminals 158 and 160, including binding screws, are provided at the inner ends of conductor strips 152 and 154, respectively, for connection to a source of current for heating resistance member 156. The screws 162 which secure strip 152 to insulation strip 150 are insulated from strip 154 and the screws 164 which similarly secure strip 154 to said insulation strip are insulated from strip 152.

As shown in Figs. 4 and 5, the heating members 156 of the several marking elements act on the same web W of recording material so as to produce directly the visual records of the body voltage variations or potentials transmitted by the selected three leads to the three channels. In order to adjust the several marking elements for uniform action on said web of recording material, provision is made for adjusting the pressure of the heating members, individually, on the web. For this purpose a flat disk 166 of spring metal is secured to the inner end of insulation strip 150 by means of screws 168. Said disk has an arcuate slot 170 forming an outer portion 172 which is free to flex in relation to the rest of the disk, and it will be noted that this portion 172 is connected to strip 150 of the marking element. As shown in Fig. 8, part 174 of the disk 166 inwardly of slot 170 is clamped between the members 176 and 178 which are secured to each other in disk clamping relation and which are mounted on the spindle 134 to constitute a mounting device for the marking element. Member 178 is in the form of cap and has a central bore in which the reduced upper end 148 of spindle 134 is received. Member 178 is adjustably secured to end portion 148 of the spindle by a set screw 180. It will be understood that by adjusting member 178 longitudinally of the spindle, the spring pressure of flexible part 172 of the disk on the companion element is thereby adjusted whereby to regulate the pressure of the marking element, specifically the heating part 156 thereof, on the recording web W.

Preferably, the marking elements MA, MB and MC are matched, being of the same size, shape and weight. Similarly, the driving coils and the means which are operated by said coils and which actuate said marking elements are preferably matched in size and weight as well as in mechanical construction.

It will be noted that the marking elements engage the recording material along a very narrow or line-like portion of the web, thus making certain that all of the marking elements act simultaneously on the recording material at points which are in true alignment laterally of the web, i. e., along a line at right angles to the direction of travel of the web, which moves in the direction of its length. This greatly facilitates the recording of several cardiograms simultaneously and in the same time co-ordinate. In order to present a very narrow or line-like portion of the web to the plurality of marking elements simultaneously, the web is caused to move over a support 182 which has a sharp edge 184 and the web is directed in its travel over said edge so as to form a fold line at said edge extending longitudinally thereof and transversely of the web. For this purpose the web is caused to move from the supply roll WR in engagement with the guide bars 184, 186 and 188 past which the web is drawn by the driven roller 190 and the companion spring-pressed pressure roller 192. The roller 190 is rotated at uniform speed, at the desired rate of paper feed, by the motor 28, suitable speed reduction gearing being provided as indicated more or less diagrammatically in Fig. 5 at 194.

A multiple-lead cardiogram, made on the apparatus of the present invention, is illustrated in Fig. 11. It will be noted that the three traces or graphs corresponding to the three leads, are disposed in three distinct lines, respectively. Ordinarily, the first or uppermost graph is made through channel A, which is connected to terminals 12—13 of the lead selector switch 10, the middle graph is made through channel B, which is connected to terminals 14—15 of said switch, and the third graph is made through channel C, which is connected to terminals 16—17 of said lead selector switch. It will be understood that legends may be applied to the lead selector switch for designating the graphs which will result from each position of the movable contacts of the lead selector switch.

The mechanism hereinbefore referred to for opening switches 49 and 50 in the event of over-excursion of the marking elements or pens, whereby to disconnect the driving coils by opening switches 42A, 42B and 42C (Fig. 1), comprises a rod 196 mounted for longitudinal movement in the spaced frame members 198. Pairs of stop members 200—202, 204—206, and 208—210 are secured to rod 196 in the path of movement or excursion of the marking elements MA, MB and MC, respectively. The stop members of each pair are laterally spaced from each other so as not to impede the normal lateral or oscillatory movements or excursions of said marking elements, but in the event of excess movement of any one of said marking elements, in either direction, that marking element engages one of the stop members and thereby moves rod 196 against the force of spring 212 or 214, as the case may be, and open switch 49 or switch 50 depending upon the direction of over-excursion of the particular marking element. When the driving coils are de-energized, the marking elements are returned to their central position by their respective diaphragms 114, and rod 196 is at the same time returned to its normal position whereupon switches 49 and 50 close automatically so that winding 42 can be re-energized as soon as the automatic time delay switch 46 closes, provided that the selector switch 10 is closed across terminals 48. As shown in Fig. 3, the power amplifier of each channel includes an adjustable resistance 216 for centering the pen which is operated by the companion driving coil. By adjustment of the movable contact of said resistance, the position of the driving coil within its unidirectional field in the companion air gap of the magnet may be controlled.

It will be understood that the invention may be embodied otherwise than as hereinbefore described and that various changes may be made without departing from the underlying idea or principles of the invention within the scope of the appended claims.

Having thus described my invention, what I claim and desire to secure by Letters Patent is:

1. In an electro-cardiograph, a multi-lead recorder comprising means for moving a sheet of flexible recording material in the direction of its length past a marking station, a plurality of movable marking elements mounted for movement laterally of said sheet, and means for operating said elements in unison, said marking elements being disposed in laterally spaced relation and having sheet marking portions positioned for marking said sheet at laterally spaced points whereby to form individual graphs having the same time relation on said sheet during the operation of said marking elements in unison while said sheet is moved, said means for operating said marking elements comprising electro-magnetic means including movable driving coils having individual windings, switching means for connecting said windings to and disconnecting them from electrical means for energizing them, electro-magnet means for closing said switching means and biased to open said switching means, and means for interrupting the circuit through the winding of said last mentioned electro-magnetic means to open the circuits of said driving coils in the event of over-excursion of any one of said marking elements, said interrupting means including an operating mechanism having parts disposed laterally of said marking elements in position to be engaged by said marking elements, respectively, when over-excursion occurs.

2. In an electro-cardiograph, a multi-lead recorder comprising means for moving a sheet of flexible recording material in the direction of its length past a marking station, and a plurality of marking elements disposed in laterally spaced relation and mounted for pivotal movement, means for moving said marking elements comprising a permanent magnet having a plurality of air gaps, said magnet including a peripherally continuous magnetized part provided with an opening and a plurality of spaced pole pieces disposed in said opening and having free end portions located in said air gaps, respectively, driving coils movably positioned in said air gaps, respectively, and mounted for rectilinear movement, and mechanisms operatively connecting said driving coils to said marking elements, respectively, for actuating the latter.

3. In an electro-cardiograph, a multi-lead recorder comprising means for moving a sheet of flexible recording material in the direction of its length past a marking station, and a plurality of marking elements disposed in laterally spaced relation and mounted for movement laterally of said sheet, means for moving said marking elements comprising a plurality of rectilinearly movable driving coils and actuating mechanisms connecting said coils to said marking elements, respectively, and a permanent magnet common to all of said coils and provided with spaced air gaps in which said driving coils are movable, respectively, said magnet having a plurality of spaced pole pieces each having a free end portion located in one of said air gaps, respectively.

4. In an electro-cardiograph, a multi-lead recorder comprising means for moving a sheet of flexible recording material in the direction of its length past a marking station, a plurality of movable marking elements mounted for movement laterally of said sheet, and means for operating said elements in unison, said marking elements being disposed in laterally spaced relation and having sheet marking portions positioned in alignment with each other for marking said sheet at said station at laterally aligned points of said sheet, and individually adjustable means for resiliently pressing said marking portions against said laterally aligned points of the sheet, said element-operating means comprising a plurality of spindles, one for each of said marking elements, and said adjustable means comprising resilient parts connected to said marking elements, respectively, and parts secured to said spindles for adjustment longitudinally thereof, respectively, said resilient parts having mounting portions engaged by companion last mentioned parts, respectively, for adjustment of said resilient parts and for operatively engaging said marking elements and said spindles, respectively, said marking elements extending transversely of said spindles whereby the resilient pressure of each marking element on the sheet of recording material is adjustable by corresponding adjustment of the companion last mentioned part longitudinally of the companion spindle.

5. In an electro-cardiograph comprising means for moving a sheet of recording material in the direction of its length for travel past a recording station, a movable marking element having a marking portion at its free end operable on said sheet at said station, and a mechanism for actuating said marking element including a spindle for pivotally moving said marking element laterally of the direction of travel of said sheet, spring means for resiliently pressing said marking portion against said sheet at said station, said last mentioned means comprising a member carried by said spindle in adjustable position longitudinally thereof, and a member for operatively connecting said marking element to said spindle, said latter member being formed of flexible sheet material and having both a part secured rigidly to said first mentioned member and a resilient part flexibly movable in relation to said rigidly secured part and connected to said marking element at the other end thereof.

6. In an electro-cardiograph, a multi-lead recorder comprising means for moving a sheet of flexible recording material in the direction of its length past a marking station, a plurality of movable marking elements disposed in laterally spaced relation and mounted for movement laterally of said sheet, each of said marking elements having a sheet marking portion positioned at said station, a sheet-support at said station having a part extending transversely of said sheet, said part being shaped to define and support only a transversely extending line-like sheet section with the portions of said sheet adjacent said line-like section at opposite sides of the latter diverging from said line-like section, said part engaging one surface of said section along said line thereof, said marking portions being positioned in alignment longitudinally of said part and being in marking engagement with the opposite surface of said section at laterally aligned points along said line thereof for marking said sheet only at said laterally aligned points, and means for operating said marking elements in unison whereby to form individual graphs having the same time relation on said sheet during the operation of said marking elements in unison while said sheet is moved for defining a continuous series of said line-like sections of the sheet on said support part, said operating means including a permanent magnet having a plurality of air gaps, said magnet including a peripherally continuous magnetized part provided with an opening and a plurality of spaced pole pieces disposed in said opening and having free end portions located in said air gaps, respectively, driving coils movably positioned in said air gaps, respectively, and mounted for rectilinear movement, and mechanisms operatively connecting said driving coils to said marking elements, respectively, for actuating the latter.

7. In an electro-cardiograph comprising means for moving a sheet of recording material in the direction of its length for travel past a recording station, a movable marking element operable on said sheet at said station, and a mechanism for actuating said marking element including a spindle for pivotally moving said marking element laterally of the direction of travel of said sheet, spring means for resiliently pressing said marking element against said sheet at said station, said last mentioned means comprising clamping means carried by said spindle in adjustable position longitudinally thereof, and a member formed of flexible sheet material and having a part clamped in said clamping means and a resilient part extending from said clamping means and movable in relation to said clamped part, said resilient part being connected to said marking element.

8. For use in an electro-cardiograph, a multi-lead recorder for body potentials comprising means for moving a sheet of flexible recording material in the direction of its length past a marking station, a support at said station comprising a longitudinal member having a part of V-shaped cross section with the apex of said part defining a narrow edge extending transversely of said sheet supporting a narrow transversely extending line-like section of said sheet at said station with portions of said sheet adjacent said line-like section at opposite sides of the latter diverging from said line-like section, a plurality of movable marking elements mounted for movement laterally of said sheet at said station, and means for operating said elements in unison, said marking elements being disposed in laterally spaced relation and having sheet marking portions positioned in alignment longitudinally of said edge of the support for marking said sheet only at laterally-aligned points on said line-like section of the sheet on said edge of the support whereby to form individual graphs having the same time relation on said sheet during the operation of said marking elements in unison while said sheet is moved for presenting a continuous series of said line-like sections of the sheet on said edge of the support, said operating means including a permanent magnet having a plurality of air gaps, said magnet including a peripherally continuous magnetized part provided with an opening and a plurality of spaced pole pieces disposed in said opening and having free end portions located in said air gaps, respectively, driving coils movably positioned in said air gaps, respectively, and mounted for rectilinear movement, and mechanisms operatively connecting said driving coils to said marking elements, respectively, for actuating the latter.

9. In an electro-cardiograph, a multi-lead recorder comprising means for moving a sheet of flexible recording material in the direction of its length past a marking station, means mounting a plurality of movable marking elements for movement laterally of said sheet, means for operating said elements in unison, said marking elements being disposed in laterally spaced relation and having sheet marking portions positioned for marking said sheet at said station at laterally aligned points of said sheet, said mounting means including a spindle for each of said marking elements, respectively, operable by said operating means, a member adjustably mounted on said spindle and resilient means interconnected between each member and the companion marking element for securing the latter to a companion spindle and for resiliently pressing said marking portions against said laterally aligned points of the sheet.

10. An electro-cardiograph, as defined in claim 9, further characterized in that each of said spindles is provided with a mounting device which is adjustable longitudinally thereof, said resilient means being carried by said mounting devices, respectively, and extending transversely of said spindles for mounting said marking elements transversely of said spindles, whereby the resilient pressure of each marking element on the sheet of recording material is adjustable by corresponding adjustment of the companion mounting device longitudinally of the companion spindle.

11. In an electro-cardiograph comprising means for moving a sheet of recording material in the direction of its length for travel past a recording station, a movable marking element having a marking portion operable on said sheet at said station, and a mechanism for actuating said marking element including a spindle for pivotally moving said marking element laterally of the direction of travel of said sheet, spring means for resiliently pressing said marking portion against said sheet at said station, said last mentioned means comprising companion clamping elements mounted for adjustment longitudinally of said spindle, and a spring member having a portion clamped between said clamping elements and an outer portion which is free to flex in relation to said clamped portion, said marking element being carried by said outer portion for regulating the pressure of said marking portion on said sheet.

12. In a recording device, a multi-lead recorder comprising means for moving a sheet of flexible recording material in the direction of its length past a marking station, and a plurality of marking elements disposed in laterally spaced relation and mounted for movement at said station, means for moving said marking elements comprising a plurality of movable driving coils and actuating mechanisms connecting said coils to said marking elements, respectively, and magnetic-field means common to all of said coils and provided with spaced air gaps in which said driving coils are movable, respectively, whereby to provide a uniform magnetic flux for said coils.

13. In a recording device, a multi-lead recorder comprising means for moving a sheet of flexible recording material in the direction of its length past a marking station, and a plurality of marking elements disposed in laterally spaced relation and mounted for movement at said station, means for moving said marking elements comprising a plurality of movable driving coils and actuating mechanisms connecting said coils to said marking elements, respectively, and permanent magnetic-field means common to all of said coils and provided with spaced air gaps in which said driving coils are movable, respectively, whereby to provide a uniform magnetic flux for said coils.

14. In a recording device, a multi-lead recorder comprising means for moving a sheet of flexible recording material in the direction of its length past a marking station, and a plurality of marking elements disposed in laterally spaced relation and mounted for movement at said station, means for moving said marking elements comprising a plurality of movable driving coils and actuating mechanisms connecting said coils to said marking elements, respectively, and magnetic-field means common to all of said coils and provided with spaced air gaps in which said driving coils are movable, respectively, whereby to provide a uniform magnetic flux for said coils, said air gaps being in series magnetic-circuit relation, and said magnetic field means having a plurality of spaced pole pieces extending into said air gaps, respectively.

15. In an electro-cardiograph, a multi-lead recorder comprising means for moving a sheet of flexible recording material in the direction of its length past a marking station, a plurality of movable marking elements disposed in laterally spaced relation and mounted for movement laterally of said sheet, each of said marking elements having a sheet marking portion positioned at said station, a sheet-support at said station having a part extending transversely of said sheet, said part being shaped to define and support only a transversely extending line-like sheet section with the portions of said sheet adjacent said line-like section at opposite sides of the latter diverging from said line-like section, said part engaging one surface of said section along said line thereof, said marking portions being positioned in alignment longitudinally of said part and being in marking engagement with the opposite surface of said section at laterally aligned points along said line thereof for marking said sheet only at said laterally aligned points, and means for operating said marking elements in unison whereby to form individual graphs having the same time relation on said sheet during the operation of said marking elements in unison while said sheet is moved for defining a continuous series of said line-like sections of the sheet on said support part, said operating means comprising a plurality of movable driving coils and actuating mechanism connecting said coils to said marking elements, respectively, and magnetic-field means common to all of said coils and provided with spaced air gaps in which said driving coils are movable, respectively, whereby to provide a uniform magnetic flux for said coils.

16. In an electro-cardiograph, a multi-lead recorder comprising means for moving a sheet of flexible recording material in the direction of its length past a marking station, a plurality of movable marking elements disposed in laterally spaced relation and mounted for movement laterally of said sheet, each of said marking elements having a sheet marking portion positioned at said station, a sheet-support at said station having a part extending transversely of said sheet, said part being shaped to define and support only a transversely extending line-like sheet section with the portions of said sheet adjacent said line-like section at opposite sides of the latter diverging from said line-like section, said part engaging one surface of said section along said line thereof, said marking portions being positioned in alignment longitudinally of said part and being in marking engagement with the opposite surface of said section at laterally aligned points along said line thereof for marking said sheet only at said laterally aligned points, and means for operating said marking elements in unison whereby to form individual graphs having the same time relation on said sheet during the operation of said marking elements in unison while said sheet is moved for defining a continuous series of said line-like sections of the sheet on said support part, said operating means comprising a plurality of movable driving coils and actuating mechanisms connecting said coils to said marking elements, respectively, and magnetic-field means common to all of said coils and provided with spaced air gaps in which said driving coils are movable, respectively, whereby to provide a uniform magnetic flux for said coils, said air gaps being in series magnetic-circuit relation, and said magnetic field means having a plurality of spaced pole pieces extending into said air gaps, respectively.

17. In a recording device having a multi-lead recorder provided with means for moving a sheet of recording material in the direction of its length past a sheet-marking station and a plurality of marking elements simultaneously movable and operable on said sheet at said station at points spaced laterally of said sheet; means for operating said marking elements individually comprising a first operating member for each marking element mounted for rectilinear movement in response to varying potentials, a second member mounted for turning movement and operatively connected to the marking element for moving the latter, and means inter-engaging said first and second members, whereby said second member is turnable in response to said varying potentials for moving said marking element in response thereto, each of said first members being provided with a driving coil, and magnetic-field means common to all of said coils and provided with spaced air gaps in which said driving coils are movable, respectively, whereby to provide a uniform magnetic flux for said coils.

GEORGE GORHAM.

(References on following page)

References Cited in the file of this patent

UNITED STATES PATENTS

| Number | Name | Date |
|---|---|---|
| 518,534 | Olan | Apr. 17, 1894 |
| 1,181,037 | Rickert, Sr. | Apr. 25, 1916 |
| 1,181,511 | Eder et al. | May 2, 1916 |
| 1,406,507 | Tuttle | Feb. 14, 1922 |
| 1,647,710 | Nichols | Nov. 1, 1927 |
| 1,816,465 | Boas et al. | July 28, 1931 |
| 1,871,944 | Best | Aug. 16, 1932 |
| 1,872,799 | Pare | Aug. 23, 1932 |
| 1,901,921 | Means | Mar. 21, 1933 |
| 1,924,777 | Flanders et al. | Aug. 29, 1933 |
| 2,044,333 | Schmidt | June 16, 1936 |
| 2,061,457 | Finch | Nov. 17, 1936 |
| 2,276,423 | Silverman | Mar. 17, 1942 |
| 2,412,639 | Traugott | Dec. 17, 1946 |
| 2,454,966 | Faus | Nov. 30, 1948 |
| 2,530,868 | Garceau | Nov. 21, 1950 |